United States Patent
Yamamoto

(10) Patent No.: US 12,531,471 B2
(45) Date of Patent: Jan. 20, 2026

(54) POWER SUPPLY CIRCUIT ASSERTING OUTPUT SIGNAL WHEN OUTPUT VOLTAGE RISES ABOVE THRESHOLD VOLTAGE, AND DRIVE CIRCUIT HAVING THE POWER SUPPLY CIRCUIT

(71) Applicant: Kosuke Yamamoto, Tokyo (JP)

(72) Inventor: Kosuke Yamamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 196 days.

(21) Appl. No.: 18/527,911

(22) Filed: Dec. 4, 2023

(65) Prior Publication Data

US 2024/0204649 A1 Jun. 20, 2024

(30) Foreign Application Priority Data

Dec. 16, 2022 (JP) .................................. 2022-201514

(51) Int. Cl.
*H02M 1/08* (2006.01)
*H02M 1/088* (2006.01)
*H02M 3/158* (2006.01)

(52) U.S. Cl.
CPC ............ *H02M 1/088* (2013.01); *H02M 3/158* (2013.01)

(58) Field of Classification Search
CPC ............................. H02M 3/158; H02M 1/088
See application file for complete search history.

(56) References Cited

U.S. PATENT DOCUMENTS

2009/0027020 A1* 1/2009 Qiu ..................... H02M 3/1588 323/265
2021/0249955 A1* 8/2021 Routledge ............. H02M 3/158

FOREIGN PATENT DOCUMENTS

JP 2020-178483 10/2020

* cited by examiner

*Primary Examiner* — Rafael O De Leon Domenech
(74) *Attorney, Agent, or Firm* — IPUSA, PLLC

(57) ABSTRACT

A power supply circuit includes an output voltage generation circuit configured to generate an output voltage higher than an input voltage, a threshold voltage generation circuit configured to generate a threshold voltage lower than the input voltage, a comparator circuit configured to assert an output signal when the output voltage rises above the threshold voltage, and a threshold voltage varying circuit configured to decrease the threshold voltage when the input voltage increases above a reference voltage.

6 Claims, 9 Drawing Sheets

FIG.3

| VREF | R1 | R2 | R3 | R4 | R5 | R6 | R7 |
|---|---|---|---|---|---|---|---|
| 1.2 V | 450 kΩ | 45 kΩ | 425 kΩ | 10 kΩ | 57.5 kΩ | 450 kΩ | 50 kΩ |

POWER SUPPLY CIRCUIT ASSERTING OUTPUT SIGNAL WHEN OUTPUT VOLTAGE RISES ABOVE THRESHOLD VOLTAGE, AND DRIVE CIRCUIT HAVING THE POWER SUPPLY CIRCUIT

CROSS-REFERENCE TO RELATED APPLICATIONS

This application is based upon and claims priority to Japanese Patent Application No. 2022-201514, filed on Dec. 16, 2022, the entire contents of which are incorporated herein by reference.

TECHNICAL FIELD

The present disclosure relates to power supply circuits and drive circuits.

BACKGROUND

Conventionally, there is a known charge pump circuit that boosts a DC input voltage applied to an input voltage terminal, and outputs the boosted voltage to an output voltage terminal (refer to Japanese Laid-Open Patent Publication No. 2020-178483, for example).

By adopting a configuration in which the output signal is asserted when a detected voltage of the boosted voltage generated by the charge pump circuit rises above a threshold voltage, it is possible to detect that the boosted voltage rose to a certain extent. However, because the charge pump circuit generates the boosted voltage higher than the DC input voltage, the boosted voltage may vary according to a variation of the DC input voltage. For this reason, in the configuration in which the detected voltage of the boosted voltage is compared with one threshold voltage, the output signal may not be appropriately asserted even when the boosted voltage increases to a certain extent.

SUMMARY

One aspect of the embodiments of the present disclosure provides a power supply circuit and a drive circuit that can appropriately assert an output signal when the output voltage generated by an output voltage generation circuit to be higher than an input voltage rises above a threshold voltage.

According to a first aspect of the present disclosure, a power supply circuit includes an output voltage generation circuit configured to generate an output voltage higher than an input voltage; a threshold voltage generation circuit configured to generate a threshold voltage lower than the input voltage; a comparator circuit configured to assert an output signal when the output voltage rises above the threshold voltage; and a threshold voltage varying circuit configured to decrease the threshold voltage when the input voltage increases above a reference voltage.

According to a second aspect of the present disclosure, a drive circuit includes the power supply circuit according to the first aspect described above; a drive source that uses the output voltage; and a logic circuit configured to enable an operation of the drive source when the output signal is asserted.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

FIG. 3 is a table illustrating specific examples of numerical values in the voltage monitoring circuit;

DETAILED DESCRIPTION

A description will hereinafter be given of embodiments of the present invention with reference to the drawings.

Figure 1:
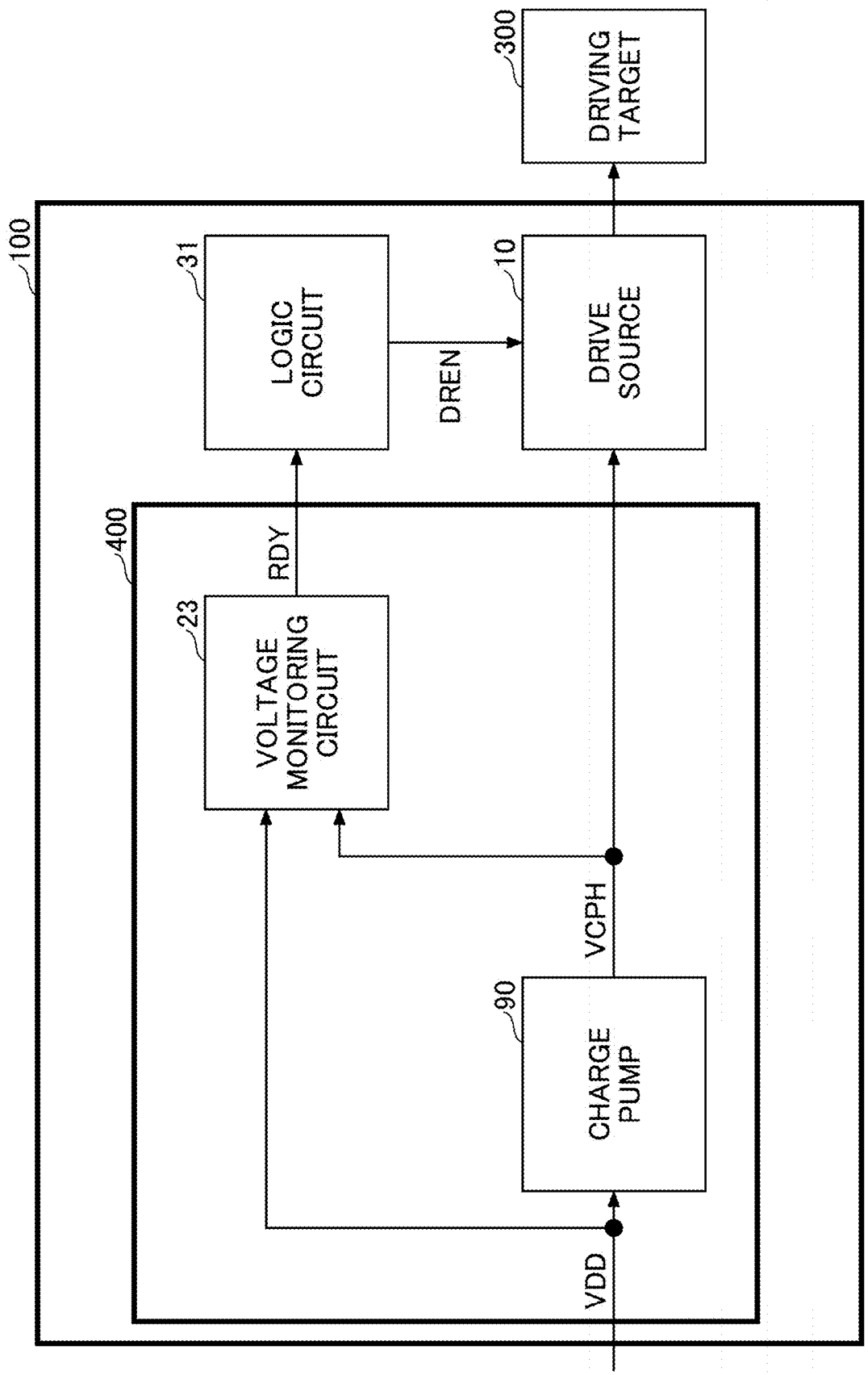
FIG. 1 is a diagram illustrating a first configuration example of a drive circuit including a power supply circuit according to one embodiment.

FIG. 1 is a diagram illustrating a first configuration example of a drive circuit including a power supply circuit according to one embodiment. A drive circuit 100 is configured to drive a driving target 300 by a drive source 10, which operates using a power supply voltage VCPH generated by a power supply circuit 400. The drive circuit 100 is formed of an integrated circuit, for example. The drive circuit 100 includes the power supply circuit 400, the drive source 10, and a logic circuit 31.

The power supply circuit 400 is configured to generate the power supply voltage VCPH using a DC input voltage (DC voltage VDD). The power supply circuit 400 includes a charge pump 90, and a voltage monitoring circuit 23.

The charge pump 90 is a circuit configured to generate a boosted (or stepped up) voltage (power supply voltage VCPH) higher than the DC input voltage (DC voltage VDD). The charge pump 90 boosts the input DC voltage VDD, and outputs the power supply voltage VCPH that is the obtained boosted voltage.

The voltage monitoring circuit 23 monitors the boosted voltage (power supply voltage VCPH) generated by the charge pump 90 to be higher than the DC voltage VDD. The voltage monitoring circuit 23 has a configuration to assert an output signal RDY when a detection voltage of the power supply voltage VCPH rises above a threshold voltage Vth which will be described later. The voltage monitoring circuit 23 can notify the logic circuit 31 that the power supply voltage VCPH generated by a boost operation of the charge pump 90 exceeded a voltage corresponding to the threshold voltage Vth, by asserting the output signal RDY. The output signal RDY may be used as a preparation signal indicating that the power supply voltage VCPH increased to a stable voltage.

When the output signal RDY is asserted, the logic circuit 31 asserts an enable signal DREN indicating whether or not to enable an operation of the drive source 10 using the power supply voltage VCPH. When the enable signal DREN is asserted, the drive source 10 starts driving the driving target 300 using the power supply voltage VCPH. Accordingly, by asserting the output signal RDY, the drive source 10 can prevent the driving target 300 from being driven in a state where the power supply voltage VCPH generated by the boost operation of the charge pump 90 is not sufficiently boosted.

Next, a configuration example of the voltage monitoring circuit 23 will be described.

Figure 2:
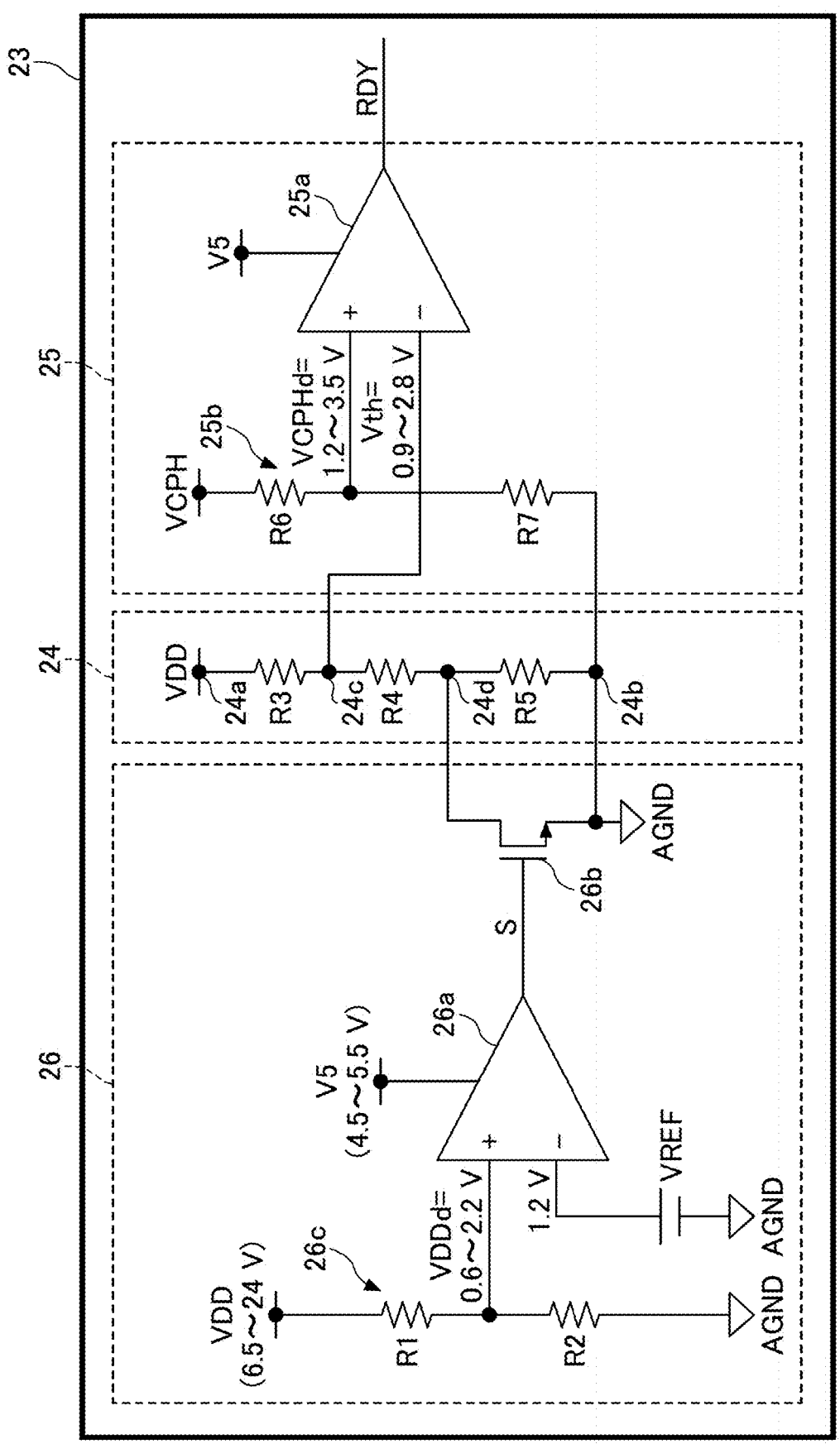
FIG. 2 is a diagram illustrating an example of a configuration of a voltage monitoring circuit in the power supply circuit according to one embodiment.

FIG. 2 is a diagram illustrating an example of the configuration of the voltage monitoring circuit. The voltage monitoring circuit 23 is configured to assert the signal RDY when a detection voltage VCPHd of the power supply voltage VCPH generated by the charge pump 90 becomes higher than the threshold voltage Vth. The voltage monitoring circuit 23 includes a threshold voltage generation circuit 24, a comparator circuit 25, and a threshold voltage variation circuit 26.

The threshold voltage generation circuit 24 is configured to generate the threshold voltage Vth that is lower than the DC input voltage (DC voltage VDD). The threshold voltage Vth is an example of a threshold voltage lower than the DC input voltage. In this example, the threshold voltage generating circuit 24 includes resistors R3, R4, and R5 for dividing the DC voltage VDD. The threshold voltage generating circuit 24 is configured to divide the DC voltage VDD, which is a potential difference between a first input node 24a and a second input node 24b, using the resistors R3, R4, and R5, and to output the threshold voltage Vth from a generation node 24c. The first input node 24a is connected to a power supply input terminal of the DC voltage VDD, the second input node 24b is connected to an analog ground terminal AGND, and the generation node 24c is connected to an inverting input terminal of the comparator 25a.

The threshold voltage generating circuit 24 includes the resistor R3 as a first resistor connected between the first input node 24a and the generation node 24c, and the resistors R4 and R5 as a second resistor connected between the second input node 24b and the generation node 24c. The resistor R4 and the resistor R5 are connected at a connection node 24d.

The comparator circuit 25 is configured to assert the signal RDY when the detection voltage VCPHd of the power supply voltage VCPH rises above the threshold voltage Vth. In this example, the comparator circuit 25 is configured to assert the high active output signal RDY, thereby switching a level of the output signal RDY from a low level to a high level.

In this example, the comparator circuit 25 includes a boosted voltage detection circuit 25b that detects the boosted voltage (power supply voltage VCPH) generated by the charge pump 90 by resistors R6 and R7, and a comparator 25a that compares the detection voltage VCPHd of the power supply voltage VCPH with the threshold voltage Vth1.

The boosted voltage detection circuit 25b is configured to detect the power supply voltage VCPH by the resistors R6 and R7, and divide the power supply voltage VCPH by the resistors R6 and R7, so as to generate the detection voltage VCPHd.

The comparator 25a is configured to compare the detection voltage VCPHd with the threshold voltage Vth, and to output the output signal RDY indicating the comparison result. In a case where the detection voltage VCPHd is higher than the threshold voltage Vth, the comparator 25a asserts the output signal RDY and sets the level of the output signal RDY to the high level. On the other hand, in a case where the detection voltage VCPHd is lower than the threshold voltage Vth, the comparator 25a negates the output signal RDY and sets the level of the output signal RDY to the low level. The comparator 25a operates at a power supply voltage V5 lower than the DC voltage VDD.

The threshold voltage varying circuit 26 is configured to lower the threshold voltage Vth when a detection voltage VDDd of the DC voltage VDD rises above a reference voltage VREF. In this example, the threshold voltage varying circuit 26 is configured to lower the threshold voltage Vth by varying a voltage dividing ratio of the DC voltage VDD when the DC voltage VDD is divided by the threshold voltage generating circuit 24.

In this example, the threshold voltage varying circuit 26 includes an input voltage detection circuit 26c that detects the DC input voltage (DC voltage VDD) by resistors R1 and R2, a comparator 26a that compares the detection voltage VDDd of the DC voltage VDD with the reference voltage VREF, and a switch 26b that lowers the threshold voltage Vth.

The input voltage detection circuit 26c is configured to detect the DC input voltage (DC voltage VDD) by the resistors R1 and R2, and to divide the DC voltage VDD by the resistors R1 and R2, so as to generate the detection voltage VDDd.

The comparator 26a is configured to compare the detection voltage VDDd with the reference voltage VREF. In a case where the detection voltage VDDd is higher than the reference voltage VREF, the comparator 26a asserts an output signal S and sets a level of the output signal S to a high level. On the other hand, in a case where the detection voltage VDDd is lower than the reference voltage VREF, the comparator 26a negates the output signal S and sets the level of the output signal S to a low level. The comparator 26a operates at the power supply voltage V5 lower than the DC voltage VDD.

The switch 26b is a semiconductor switch that turns on or off according to the output signal S. In this example, the switch 26b is an N-channel metal oxide semiconductor field effect transistor (MOSFET). The switch 26b is turned on by the assertion of the output signal S, and the switch 26b is turned off by the negation of the output signal S. The resistor R5 is short-circuited when the switch 26b is turned on, and the short-circuiting of the resistor R5 is canceled when the switch 26b is turned off.

In the case where the detection voltage VDDd is higher than the reference voltage VREF, the threshold voltage varying circuit 26 turns on the switch 26b to short-circuit a part of the second resistor (the resistor R5 in this example), and reduce a resistance value between the first input node 24a and the second input node 24b. Hence, the voltage dividing ratio of the DC voltage VDD is varied so that the threshold voltage Vth decreases. On the other hand, in the case where the detection voltage VDDd is lower than the reference voltage VREF, the threshold voltage varying circuit 26 turns off the switch 26b to cancel the short-circuiting of the part of the second resistor (the resistor R5 in this example), and increase the resistance value between the first input node 24a and the second input node 24b. Thus, the voltage dividing ratio of the DC voltage VDD is varied so that the threshold voltage Vth increases.

Next, the effects of the threshold voltage varying circuit 26 in the voltage monitoring circuit 23 will be described, with reference to FIG. 3, FIG. 4, and FIG. 5.

FIG. 3 is a table illustrating specific examples of typical values of the reference voltage VREF and each of the resistors in the voltage monitoring circuit 23. FIG. 4 is a diagram illustrating a relationship between the DC input voltage (DC voltage VDD) and a ratio of the boosted voltage (power supply voltage VCPH) generated by the charge pump 90 to the power supply voltage VCPH when the output signal RDY is asserted, in a comparative example for a case where a target boosted voltage VCPHg of the boosted voltage is 100. FIG. 4 illustrates data measured for a configuration of the voltage monitoring circuit 23 illustrated in FIG. 2 excluding the threshold voltage varying circuit 26. FIG. 5 is a diagram illustrating a relationship between the DC input voltage (DC voltage VDD) and a ratio of the boosted voltage (power supply voltage VCPH) generated by the charge pump 90 to the power supply voltage VCPH when the output signal RDY is asserted, in an exemplary implementation for a case where the target boosted voltage VCPHg of the boosted voltage is 100. FIG. 5 illustrates data measured for the configuration of the voltage monitoring circuit 23 illustrated in FIG. 2.

Figure 4:
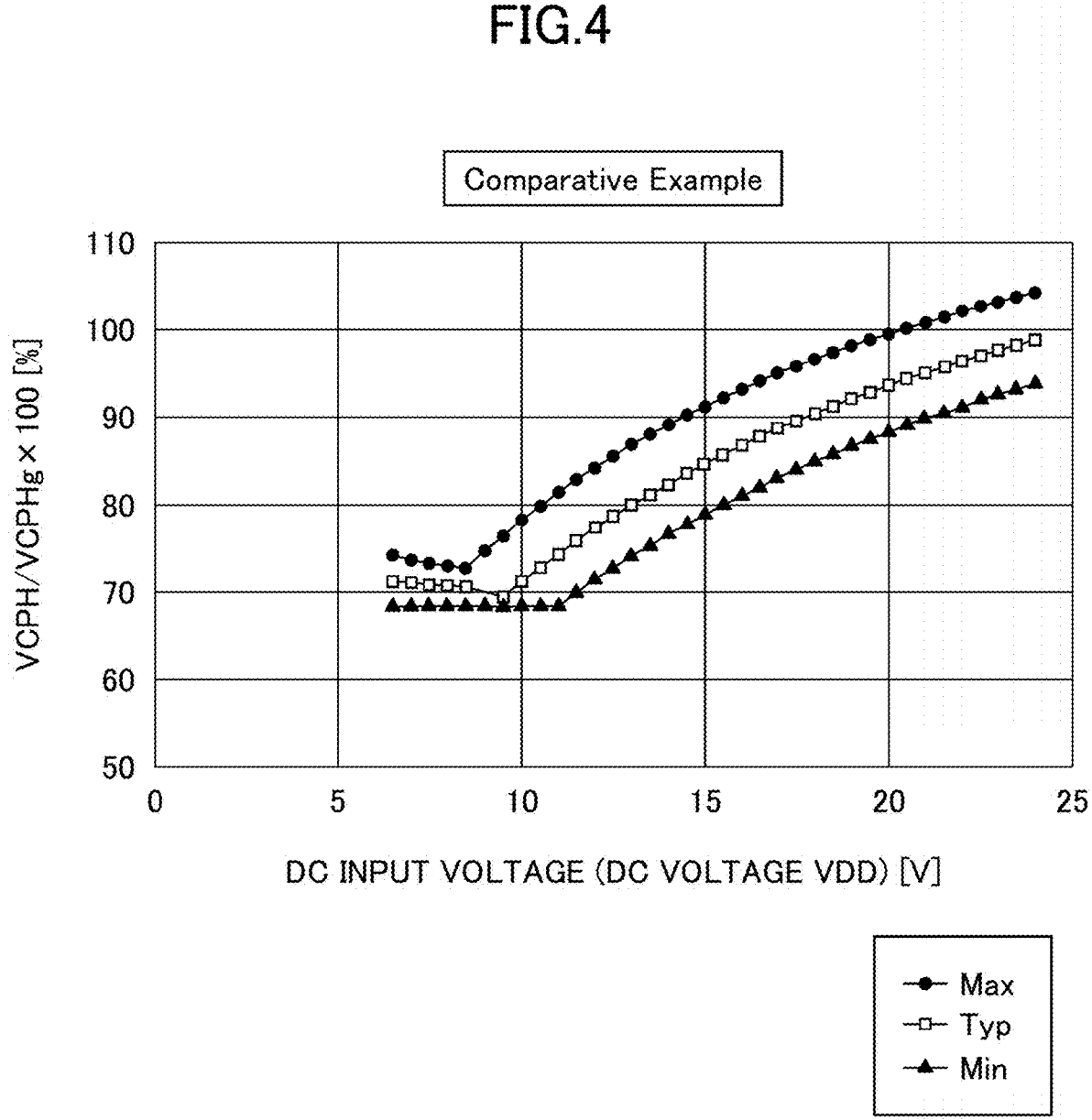
FIG. 4 is a diagram illustrating a relationship between a DC input voltage (DC voltage VDD) and a ratio of a boosted voltage (power supply voltage VCPH) generated by a charge pump to the power supply voltage VCPH when an output signal RDY is asserted, in a comparative example for a case where a target boosted voltage VCPHg of the boosted voltage is 100.
Figure 5:
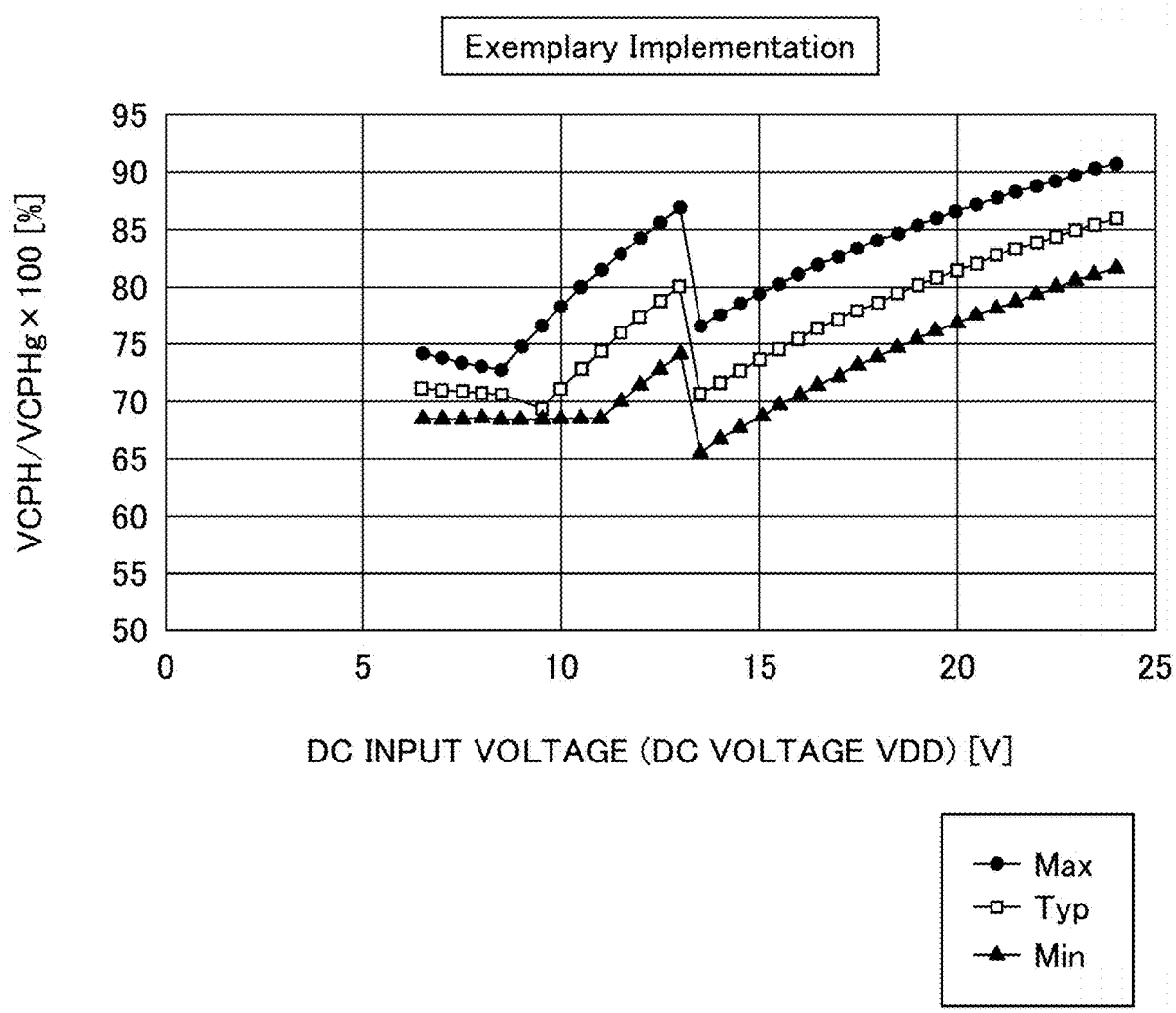
FIG. 5 is a diagram illustrating a relationship between a DC input voltage (DC voltage VDD) and a ratio of a boosted voltage (power supply voltage VCPH) generated by a charge pump to the power supply voltage VCPH when an output signal RDY is asserted, in an exemplary implementation for a case where a target boosted voltage VCPHg of the boosted voltage is 100.

In legends illustrated inside boxes in FIG. 4 and FIG. 5, "Typ" indicates a case where the numerical values are as illustrated in FIG. 3, "Max" indicates a case where a boost ratio B becomes a maximum due to an error in the power supply voltage VCPH generated by the charge pump 90, and "Min" indicates a case where the boost ratio B becomes a minimum due to the error in the power supply voltage VCPH generated by the charge pump 90.

According to "Max" in FIG. 4 for the configuration without the threshold voltage varying circuit 26, when the DC voltage VDD is 15 [V], for example, and a ratio of the boosted voltage (power supply voltage VCPH) generated by the charge pump 90 increases to approximately 91% of the boost target voltage value VCPHg, the output signal RDY is asserted. However, in a region where the DC voltage VDD is higher than approximately 20 [V], the ratio of the power supply voltage VCPH when the output signal RDY is asserted exceeds 100% of the boost target voltage value VCPHg. This means that the output signal RDY is not asserted even when the boosted voltage (power supply voltage VCPH) generated by the charge pump 90 rises to the target boosted voltage value VCPHg.

As described above, in the case where the threshold voltage varying circuit 26 is not provided (when the threshold voltage Vth does not decrease due to the increase in the DC voltage VDD), the output signal RDY may not be appropriately asserted even when the boosted voltage (power supply voltage VCPH) generated by the charge pump 90 sufficiently increases.

In contrast, according to FIG. 5 for the configuration provided with the threshold voltage varying circuit 26, even in a region where the DC voltage VDD is higher than 20 [V], the ratio of the boosted voltage (power supply voltage VCPH) when the output signal RDY is asserted does not exceed 100% of the boost target voltage value VCPHg. In this example, when the detection voltage VDDd of the DC voltage VDD rises above the reference voltage VREF (when the DC voltage VDD rises above approximately 13 [V]), the threshold voltage varying circuit 26 lowers the threshold voltage Vth. Thus, even when the DC voltage VDD varies widely, the output signal RDY is asserted when the boosted voltage (power supply voltage VCPH) generated by the charge pump 90 falls within a range of approximately 65% to approximately 95% of the target boosted voltage value VCPHg.

As described above, according to the present embodiment, when a detection voltage VCHPd of the boosted voltage (power supply voltage VCPH) generated by the charge pump 90 rises above the threshold voltage Vth, the control signal RDY can be appropriately asserted. By appropriately asserting the output signal RDY, the drive source 10 illustrated in FIG. 1 can be prevented from driving the driving target 300 in a state where the power supply voltage VCPH generated by the boost operation of the charge pump 90 is not sufficiently increased, for example.

Next, another configuration example of the power supply circuit will be described.

Figure 6:
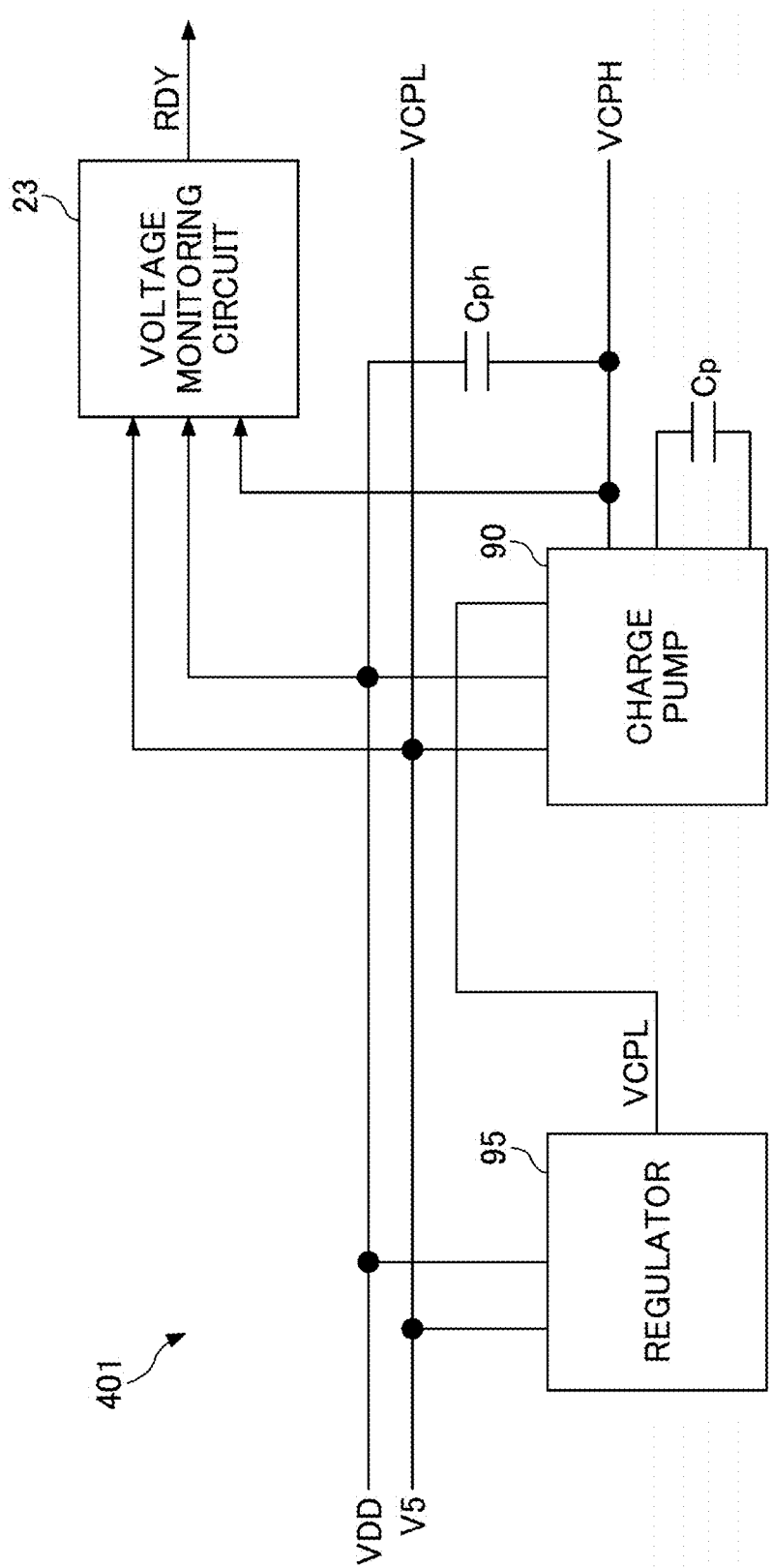
FIG. 6 is a diagram illustrating a configuration example of the power supply circuit according to one embodiment.

FIG. 6 is a diagram illustrating a configuration example of the power supply circuit according to one embodiment. The power supply circuit 401 includes a regulator 95, in addition to the charge pump 90 and the voltage monitoring circuit 23. The regulator 95 is a circuit configured to generate a regulator voltage VCPL lower than the DC input voltage (DC voltage VDD). The regulator 95 performs a regulating operation of bucking (or stepping down) the DC input voltage (DC voltage VDD) to a predetermined target voltage, thereby generating a regulated constant voltage (regulator voltage VCPL). The regulator 95 may have a known circuit configuration.

The charge pump 90 adds the DC input voltage (DC voltage VDD) to the regulator voltage VCPL, so as to generate the boosted voltage (power supply voltage VCPH). Thus, the boosted voltage (power supply voltage VCPH) becomes equal to a sum of the regulator voltage VCPL and the DC voltage VDD (VCPH=VCPL+VDD).

For example, when the DC voltage VDD input to the power supply circuit 401 varies in a range of 6.5 [V] to 24 [V], and the regulator voltage VCPL is regulated in a range of 5.0 [V] to 5.5 [V], the power supply voltage VCPH generated by the charge pump 90 varies in a range of 11.5 [V] to 29.5 [V]. Accordingly, the power supply circuit 401 can cope with a wide input voltage range.

Figure 7:
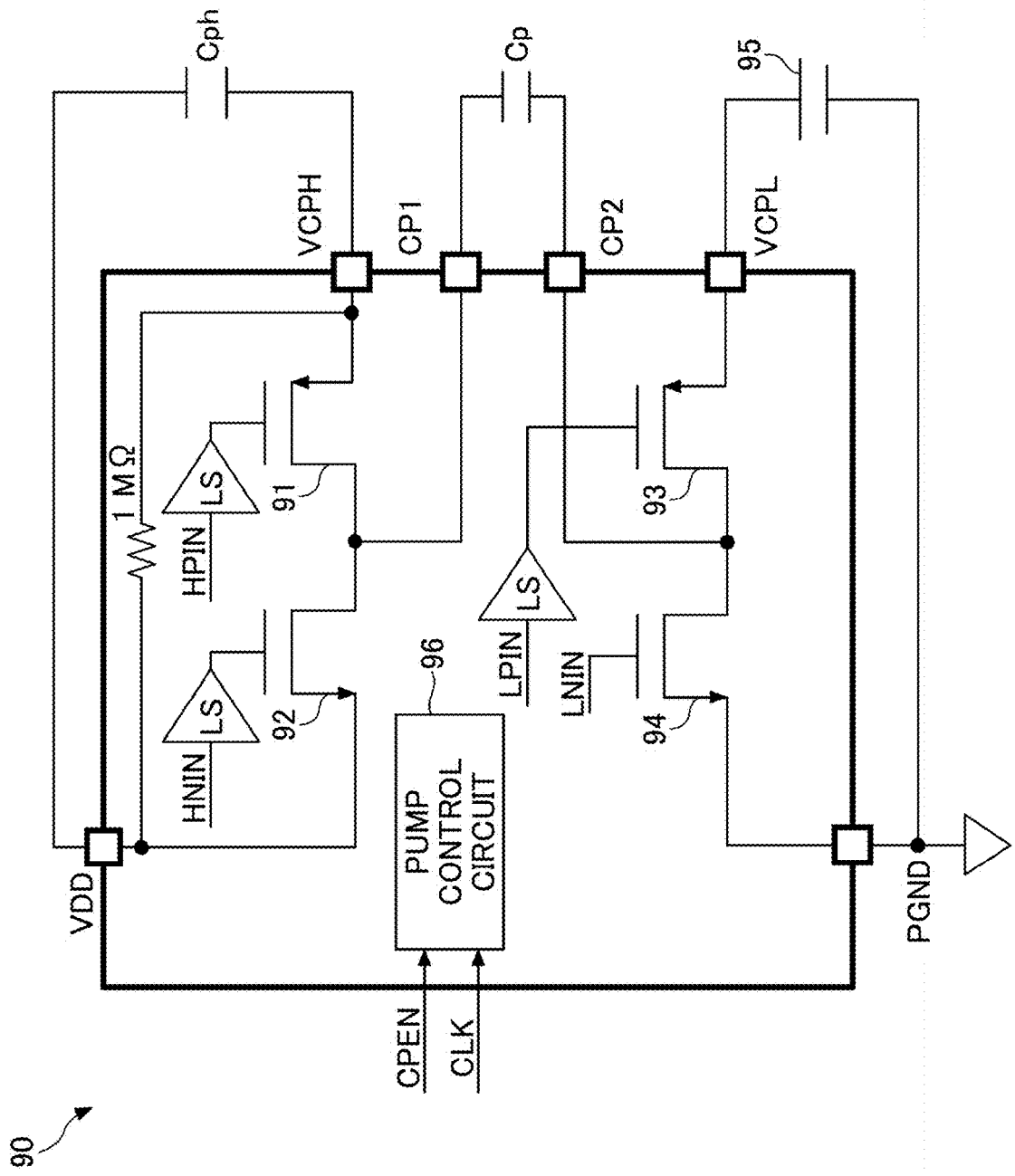
FIG. 7 is a diagram illustrating a configuration example of a charge pump in the power supply circuit according to one embodiment.

FIG. 7 is a diagram illustrating a configuration example of the charge pump in the power supply circuit according to one embodiment. The charge pump 90 is configured to add the DC voltage VDD charged in a capacitor Cp to the regulator voltage VCPL generated by the regulator 95, thereby generating the boosted voltage (power supply voltage VCPH) in a capacitor Cph.

In FIG. 7, the charge pump 90 includes a plurality of switches 91, 92, 93, and 94, the capacitors Cp and Cph, and a pump control circuit 96.

The switch 91 and the switch 92 are connected in series between a power supply node of the DC voltage VDD and a power supply node of the power supply voltage VCPH. The switch 91 is a semiconductor switch configured to turn on or off according to a control voltage HPIN. The switch 92 is a semiconductor switch configured to turn on or off according to a control voltage HNIN. The switch 93 and the switch 94 are connected in series between a power supply node of the regulator voltage VCPL and a power ground PGND. The switch 93 is a semiconductor switch configured to turn on or off according to a control voltage LPIN. The switch 94 is a semiconductor switch configured to turn on or off according to a control voltage LNIN. In this example, the switches 91 and 93 are P-channel MOSFETs, and the switches 92 and 94 are N-channel MOSFETs.

The capacitor Cph is connected between both ends of a series circuit formed by the switch 91 and the switch 92. The capacitor Cp is connected between a connection node CP1 between the switch 91 and the switch 92, and a connection node CP2 between the switch 93 and the switch 94.

Figure 8:
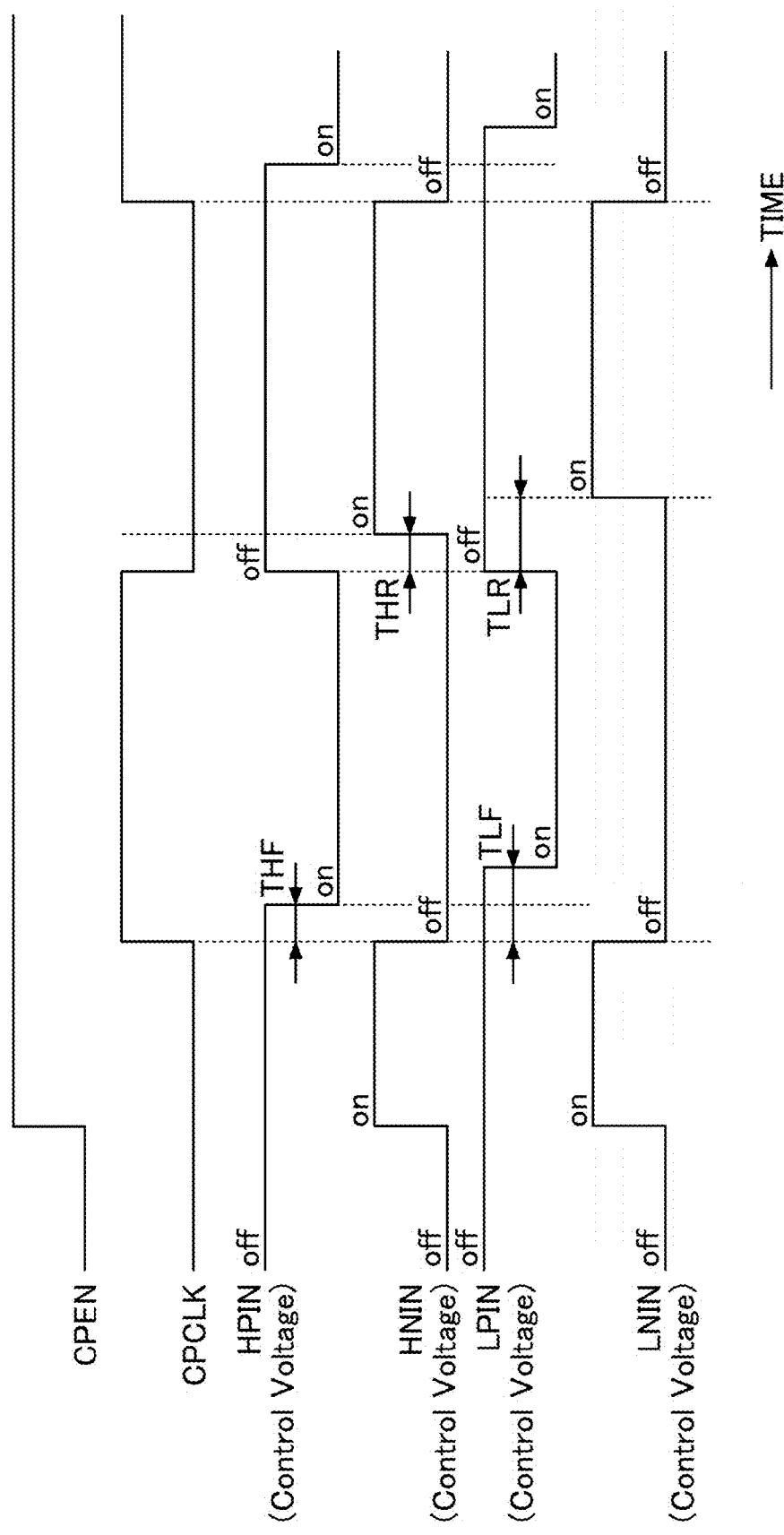
FIG. 8 is a timing chart illustrating an example of control timings of the charge pump.

The pump control circuit 96 is configured to generate the control voltages HPIN, HNIN, LPIN, and LNIN in synchronism with a clock CPCLK, according to control timings illustrated in FIG. 8, when a pump enable signal CPEN is asserted. Hence, the charge pump 90 can generate the boosted voltage (power supply voltage VCPH) in which the DC input voltage (DC voltage VDD) is superimposed on the regulator voltage VCPL.

Figure 9:
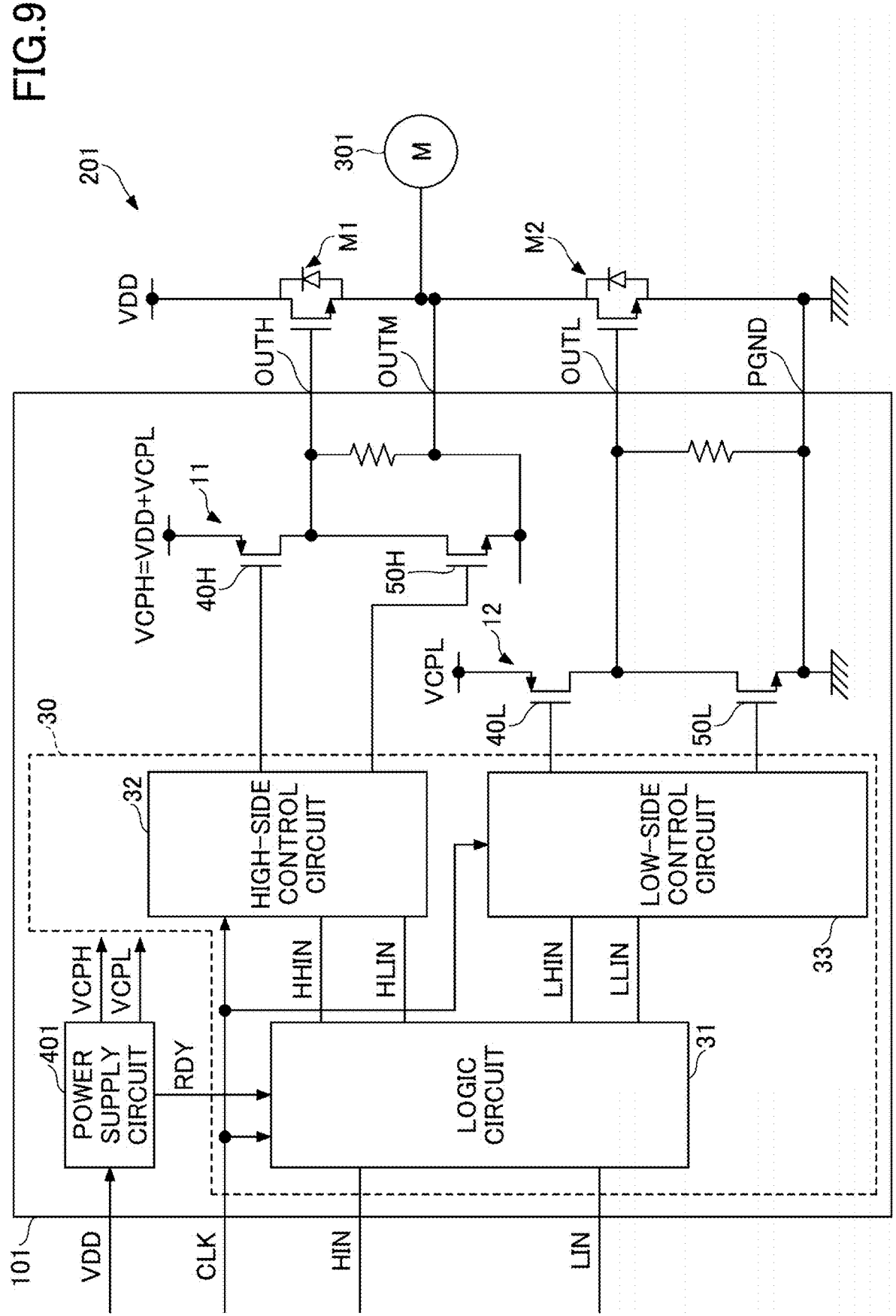
FIG. 9 is a diagram illustrating a configuration example of a power conversion device including the drive circuit according to one embodiment.

FIG. 9 is a diagram illustrating a configuration example of a power conversion circuit including the drive circuit according to one embodiment. A power conversion circuit 201 is configured to convert the DC voltage VDD supplied from a DC power supply into an AC voltage to be supplied to the load 301, such as the motor M or the like. The power conversion circuit 201 includes a high-side transistor M1, a low-side transistor M2, and the drive circuit 101 that drives the transistors M1 and M2.

In a case where the power conversion circuit 201 is an inverter configured to generate a three-phase AC power of phases U, V, and W, for example, the power conversion circuit 201 includes three switching circuits having the same configuration including the transistors M1 and M2 and the drive circuit 101, respectively. FIG. 10 illustrates one switching circuit of a plurality of switching circuits (for example, three switching circuits of the phases U, V, and W) included in the power conversion circuit 201.

The power conversion circuit 201 is not limited to an inverter configured to convert the direct current into the alternating current, and may be a converter configured to convert the direct current into a direct current. The power conversion circuit 201 may be used as a power supply circuit. In this example, the load 301 is the motor M that rotates a cooling fan or the like, but the type of the load 301 is not limited thereto.

The drive circuit 101 is configured to drive the transistors M1 and M2 that are externally connected to the drive circuit 101. Each of the transistors M1 and M2 is a gate-driven switching element having a first main electrode, a second main electrode, and a gate electrode. Specific examples of the gate-driven switching element include an N-channel field effect transistor (FET) having a drain, a source, and a gate, an insulated gate bipolar transistor (IGBT) having a collector, an emitter, and a gate, or the like. Specific examples of the FET include a metal oxide semiconductor field effect transistor (MOSFET) or the like. The drain or the collector is an example of the first main electrode. The source or the emitter is an example of the second main electrode. FIG. 9 illustrates a case where the transistors M1 and M2 are N-channel FETs.

The drive circuit 101 is a pre-driver configured to drive the transistors M1 and M2 that drive the load 301, such as the motor M or the like. The drive circuit 101 is formed by an integrated circuit, for example.

The drive circuit 101 is configured to drive the transistors M1 and M2 according to signals (a clock CLK, a high-side command signal HIN, and a low-side command signal LIN) supplied from a controller (not illustrated), so as to switch (that is, turn on or off) the transistors M1 and M2. The high-side command signal HIN and the low-side command signal LIN vary in synchronism with the clock CLK. The high-side command signal HIN includes an ON command for commanding the high-side transistor M1 to be turned on, and an OFF command for commanding the high-side transistor M1 to be turned off. The low-side command signal LIN includes an ON command for instructing the low-side transistor M2 to be turned on, and an OFF command for instructing the low-side transistor M2 to be turned off. The drive circuit 101 alternately turns on the transistors M1 and M2, with a dead time for turning off the transistors M1 and M2 interposed therebetween, according to the high-side command signal HIN and the low-side command signal LIN.

The drive circuit 101 includes a control circuit 30, a high-side source current source 40H, a high-side sink current source 50H, a low-side source current source 40L, and a low-side sink current source 50L. In addition, the drive circuit 101 includes a high-side drive terminal OUTH, an intermediate terminal OUTM, a low-side drive terminal OUTL, and a ground terminal PGND. The drive circuit 101 further includes a power supply circuit 401 illustrated in FIG. 6.

The control circuit 30 is configured to control the source current source 40H that turns on the transistor M1, and to control the sink current source 50H that turns off the transistor M1. Moreover, the control circuit 30 is configured to control the source current source 40L that turns on the transistor M2, and to control the sink current source 50L that turns off the transistor M2. The control circuit 30 includes a logic circuit 31, a high-side control circuit 32, and a low-side control circuit 33.

The logic circuit 31 is configured to generate a drive command HHIN for source control and a drive command HLIN for sink control, based on the high-side command signal HIN and the low-side command signal LIN. In addition, the logic circuit 31 is configured to generate a drive command LHIN for source control and a drive command LLIN for sink control, based on the high-side command signal HIN and the low-side command signal LIN. The logic circuit 31 may be provided externally to the control circuit 30 or the drive circuit 101. The drive command HHIN is an example of a source drive command. The drive command HLIN is an example of a sink drive command.

The high-side control circuit 32 controls a source current generated by the high-side source current source 40H, according to the drive command HHIN for source control. The high-side control circuit 32 controls a sink current generated by the high-side sink current source 50H, according to the drive command HLIN for sink control. The high-side control circuit 32 alternately turns on output transistors of the current sources 40H and 50H, with a dead time for turning off the output transistors of the current sources 40H and 50H interposed therebetween, according to the drive command HHIN and the drive command HLIN.

The low-side control circuit 33 controls a source current generated by the low-side source current source 40L, according to the drive command LHIN for source control. The low-side control circuit 33 controls a sink current generated by the low-side sink current source 50L, according to the drive command LLIN for sink control. The low-side control circuit 33 alternately turns on output transistors of the current sources 40L and 50L, with a dead time for turning off the output transistors of the current sources 40L and 50L interposed therebetween, according to the drive command LHIN and the drive command LLIN.

The source current source 40H includes the output transistor formed of a P-channel MOSFET, and generates a source current to be delivered to a gate of the transistor M1. The source current source 40H is connected between the drive terminal OUTH connected to the gate of the transistor M1, and the power supply node of the high-side power supply voltage VCPH.

The power supply voltage VCPH is equal to a sum of the DC voltage VDD and the low-side power supply voltage (regulator voltage VCPL). The power supply voltage VCPH is generated by the charge pump 90 inside the power supply circuit 401, using the DC voltage VDD and the regulator voltage VCPL, for example.

The sink current source 50H includes the output transistor formed by an N-channel MOSFET, and generates a sink current to be absorbed from the gate of the transistor M1. The sink current source 50H is connected between the drive terminal OUTH connected to the gate of the transistor M1, and the intermediate terminal OUTM connected to the load 301.

The source current source 40L includes the transistor formed of a P-channel MOSFET, and generates a source current to be delivered to the gate of the transistor M2. The source current source 40L is connected between the drive terminal OUTL connected to the gate of the transistor M2, and the power supply node of the low-side power supply voltage (regulator voltage VCPL).

The sink current source 50L includes the output transistor formed by an N-channel type MOSFET, and generates a sink current to be absorbed from the gate of the transistor M2. The sink current source 50L is connected between the drive terminal OUTL connected to the gate of the transistor M2, and the ground terminal PGND connected to the ground.

The drive circuit 101 is configured to drive the transistors M1 and M2 by a constant current driving method. The drive circuit 101 delivers the source current from the PMOS output transistor of the source current source 40H to the drive terminal OUTH, so as to charge the gate of the transistor M1 and turn on the transistor M1. The drive circuit 101 absorbs the sink current from the drive terminal OUTH into the NMOS output transistor of the sink current source 50H, so as to discharge the gate of the transistor M1 and turn off the transistor M1. Similarly, the drive circuit 101 delivers the source current from the PMOS output transistor of the source current source 40L to the drive terminal OUTL, so as to charge the gate of the transistor M2 and turn on the transistor M2. The drive circuit 101 absorbs the sink current from the drive terminal OUTL into the NMOS output transistor of the sink current source 50L, so as to discharge the gate of the transistor M2 and turn off the transistor M2.

The drive circuit 101 includes the high-side source current source 40H, as a first drive source 11 that uses the boosted (or stepped up) voltage (power supply voltage VCPH) generated by the charge pump 90 inside the power supply circuit 401. The drive circuit 101 includes the low-side source current source 40L, as a second drive source 12 that uses the bucked (stepped down) voltage (power supply voltage VCPL) generated by the regulator 95 inside the power supply circuit 401. The charge pump 90 generates the power supply voltage VCPH as a power supply voltage for operating the source current source 40H that delivers the source current to the drive terminal OUTH.

When the output signal RDY generated by the voltage monitoring circuit 23 inside the power supply circuit 401 is asserted, the logic circuit 31 enables the operations of the high-side source current source 40H and the low-side source current source 40L. Accordingly, the logic circuit 31 starts generating the drive command HHIN for source control and the drive command HLIN for sink control, based on the high-side command signal HIN and the low-side command signal LIN. The logic circuit 31 starts generating the drive command LHIN for source control and the drive command LLIN for sink control, based on the high-side command signal HIN and the low-side command signal LIN. Accordingly, when the output signal RDY is asserted, the first drive source 11 and the second drive source 12 can prevent the driving targets (the transistors M1 and M2 and the load 301) from being driven in a state where the power supply voltage VCPH generated by the boost (or step-up) operation of the charge pump 90 has not increased sufficiently. The transistors M1 and M2 and the load 301 are examples of the driving target 300 illustrated in FIG. 1, and the first drive source 11 is an example of the drive source 10 illustrated in FIG. 1.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

For example, the charge pump 90 in the embodiment described above is an example of an output voltage generation circuit configured to generate an output voltage higher than an input voltage. The output voltage generation circuit is not limited to the circuit configuration of the charge pump 90 illustrated in FIG. 7.

According to each of the embodiments, it is possible to provide a power supply circuit and a drive circuit that can appropriately assert an output signal when the output voltage generated by an output voltage generation circuit to be higher than an input voltage rises above a threshold voltage.

What is claimed is:

1. A power supply circuit comprising:
an output voltage generation circuit configured to generate an output voltage higher than an input voltage;
a threshold voltage generation circuit configured to generate a threshold voltage lower than the input voltage;
a comparator circuit configured to assert an output signal when the output voltage rises above the threshold voltage; and
a threshold voltage varying circuit configured to lower the threshold voltage when the input voltage increases above a reference voltage.

2. The power supply circuit as claimed in claim 1, wherein
the threshold voltage generation circuit generates the threshold voltage by dividing the input voltage by a voltage dividing ratio, and
the threshold voltage varying circuit lowers the threshold voltage by varying the voltage dividing ratio of the input voltage.

3. The power supply circuit as claimed in claim 2, wherein
the threshold voltage generation circuit divides the input voltage having a potential difference between a first input node and a second input node, using a first resistor coupled between the first input node and a generation node and a second resistor coupled between the second input node and the generation node and forming a resistance voltage divider, and outputs the threshold voltage from the generation node, and the threshold voltage varying circuit varies the voltage dividing ratio by varying a resistance value of the second resistor.

4. The power supply circuit as claimed in claim 1, further comprising:

a regulator configured to generate a constant voltage lower than the input voltage, wherein the output voltage generation circuit generates the output voltage by adding the input voltage to the constant voltage.

5. A drive circuit comprising:

the power supply circuit according to claim 4;

a first drive source that uses the output voltage;

a second drive source that uses the constant voltage; and a logic circuit configured to enable an operation of the first drive source when the output signal is asserted.

6. A drive circuit comprising:

the power supply circuit according to claim 1;

a drive source that uses the output voltage; and a logic circuit configured to enable an operation of the drive source when the output signal is asserted.

\* \* \* \* \*